(Model.)
P. SINNHOLD.
SEED DRILL.
No. 265,708. Patented Oct. 10, 1882.
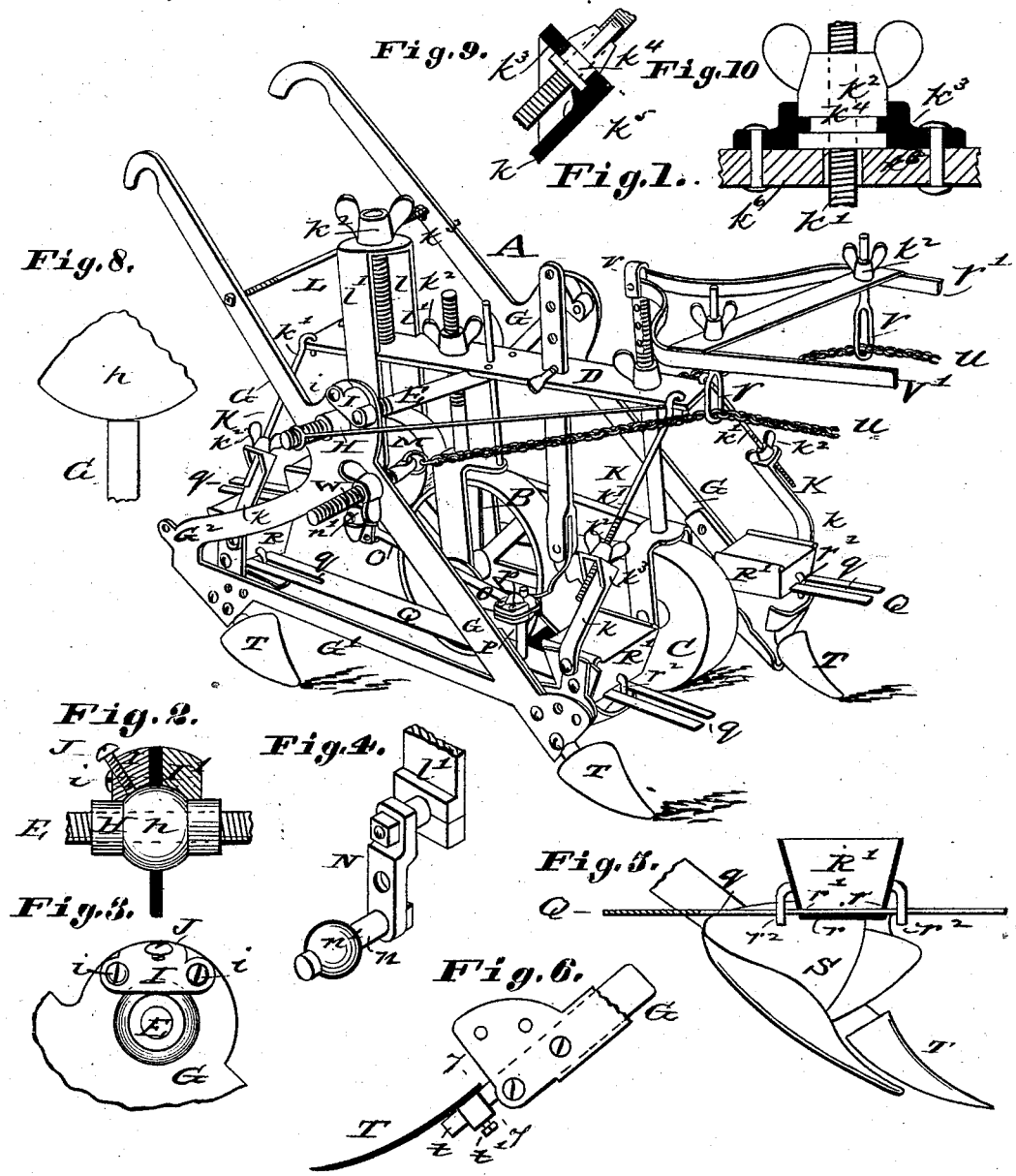
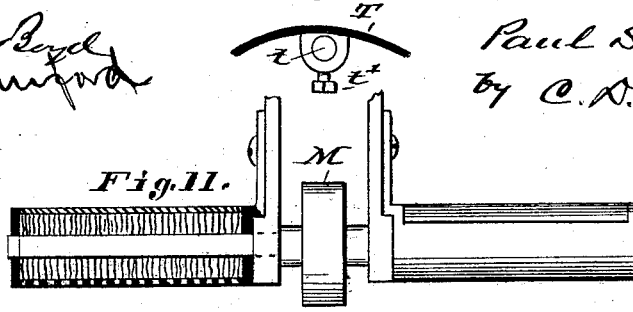
Attest
Inventor:
Paul Sinnhold
by C. D. Moody.
atty.

UNITED STATES PATENT OFFICE.

PAUL SINNHOLD, OF ST. LOUIS, MISSOURI.

SEED-DRILL.

SPECIFICATION forming part of Letters Patent No. 265,708, dated October 10, 1882.

Application filed February 20, 1882. (Model.)

*To all whom it may concern:*

Be it known that I, PAUL SINNHOLD, of St. Louis, Missouri, have made a new and useful Improvement in Seed-Drills, of which the following is a full, clear, and exact description, reference being had to the annexed drawings, making part of this specification, in which—

Figure 1 is a view in perspective of the improved machine; Fig. 2, a view of the parts immediately associated with the joint connecting the shovel-beam and its bearing; Fig. 3, a side elevation of the parts shown in Fig. 2; Fig. 4, a view in perspective of the crank used in operating the seed-slide; Fig. 5, a sectional view of one of the seed-boxes and parts immediately therewith connected; Fig. 6, a side view, showing the connection of the shovel with the beam; Fig. 7, a cross-section taken on the line 7 7 of Fig. 6; Fig. 8, a diagram, upon an enlarged scale, illustrating the bearing of the shovel-beam on the ball-joint; Fig. 9, a sectional view of a portion of the device used in adjusting the shovel-beam laterally; Fig. 10, a side elevation, showing one of the nuts used in adjusting various parts of the machine; and Fig. 11, a view, partly in section, of a device used in sowing broadcast.

The same letters denote the same parts.

I have heretofore (August 29, 1865, and July 26, 1881) patented improvements in cultivators and seed-drills.

The present construction is partly an attachment to and partly an improvement upon the constructions referred to. It has relation to the means used in jointing the plow-beam to its bearing, to the device used in adjusting the plow-beam laterally, to the peculiar form of nut employed in the adjusting devices, to the means used in discharging the seed from the seed-boxes, and to the draft device.

A represents the improved machine, having the main beam D, the rear supporting-wheel, B, the forward supporting-wheel, C, and the cross-bar E, the latter being the support for the shovel-beams G G. The connection of the latter with the bar E is shown more distinctly in Figs. 2 and 3. A sleeve, H, having a spherical boss, $h$, is secured upon the bar E. The beam G is perforated transversely, enabling it to be passed onto and encircle the boss $h$. The perforation is preferably cylindrical to enable the beam to have the narrowest possible bearing on the boss, as indicated in the diagram of Fig. 8.

I represents a plate or part secured by suitable fastenings, $i$, to the beam G. The plate serves mainly as a holder for a set-screw, J, which in turn, by being set inward to bear upon the boss $h$, operates to fix the beam G rigidly upon the boss. The plate I may have a counterpart, I', upon the opposite side of the beam G.

The construction described enables the beam G to be turned freely upon its bearing until the proper angle of adjustment is obtained, and there held until it is desired to change its position. The beams G G can be adjusted and held laterally by means of the devices K K, each of which devices consists as follows: a strap, $k$, a threaded bolt, $k'$, and the nut $k^2$. The strap $k$ is attached at its lower or outer end to the beam G. At its upper or inner end it is furnished with a projection, $k^3$, which serves as a holder for the nut $k^2$. The latter engages with the thread upon the bolt $k'$, which in turn, at its upper end, is attached to the main beam D. The nut $k^2$ is of the peculiar shape shown in Figs. 9 and 10, having in its outer surface a groove, $k^4$, in which engages the plate $k^3$. A lip or other form of projection, $k^5$, projects or comes beneath the under side of the nut. The nut then, when rotated, moves with the part $k$, being, in fact, a fixture thereon. The bolt $k'$ and part $k$, however, are drawn together or opened apart, as desired, by the rotation of the nut, and the beam G thereby turned toward or from the main beam D. The devices K are preferably used in pairs—two at the forward end of the machine and two at the rear end. The nut $k^2$ is preferably used in the adjustment of various parts of the machine, as seen in the drawings, Fig. 1, and the form of the holder $k^3$ may, so far as its particular connection with any special part of the machine is concerned, be extended and shaped to suit the object of that special part, the only requisite being that the holder be shaped to engage in the groove $k^4$ of the nut, and enable the nut to remain a fixture upon the holder. In Fig. 10 the holder $k^3$ is shown attached to a plate or part, $k^6$. This last-described modification is preferably used in adjusting the device L. This device is used in setting the seeding mechanism in operation, and consists of the screw $l$, fixed in the beam D, the nut $k^2$, the holder $k^3$, and the arms $l'$ $l'$, which extend from the holder $k^3$ downward, and at their lower ends are provided with bearings to receive a friction-pulley, M. By suitably turning the nut $k^2$ the pulley M is made to bear upon the wheel B, and thereby caused to rotate.

A crank, N, attached to the shaft of the pulley M, is provided with a wrist-pin, $n$, of the shape shown in Fig. 4, the pin having a spherical boss, $n'$. A pitman, O, connects at one end with the boss $n'$, and at the other is jointed to a similar boss, $p$, upon an upright, P, that is attached to the slide-bar Q. The connections of the pitman O with the boss $n'$ and the boss $p$ are similar to that of the beam G with the boss $h$. The rotation of the crank N imparts a reciprocating movement to the slide-bar Q. The latter at its ends is slotted, the slotted ends working through the seed-boxes R R'. The boxes have imperforate bottoms $r$, but are suitably perforated at $r'$ $r'$ to provide for the movement of the slide-bar. The seed falls into the slot $q$, and as the slide-bar is moved to and fro is carried out of the seed-box and dropped into the spout S, and thence to the ground. The pins $r^2$ serve as guides for the bar Q, and also to direct the seed downward into the spout.

The shovels T are attached to rounded bearings $t$, enabling the shovels to be set higher up or lower down, or to be turned around on the bearing, as desired, and when adjusted to be held by means of the screw $t'$. The beam G has a tie, G', extending from the lower end of the beam G to the lower end of the beam $G^2$. If desired, the three parts G G' $G^2$ may be in one piece.

U U represent the trace-chains leading through the vertically-adjustable guides V V to the laterally-adjustable bolts W W. The guides $r$ depend from the thills V'. The latter are pivoted at $v$ to the standard of the wheel C, enabling the thills to be turned upward and downward on the standard, and even entirely over backward, and over the beam B. The bolts W are held in the beams G G.

I claim—

1. The combination of the beam G, the bar E, and the boss $h$, substantially as described.

2. The combination of the beam G, the plate I, the screw J, the bar E, and the boss $h$, substantially as described.

3. The combination of the bolt $k'$, the grooved nut $k^2$, and the holder $k^3$, substantially as described.

4. The combination of the pulley M, the crank N, the pin $n$, having the boss $n'$, the pitman O, the upright P, having the boss $p$, and the slide-bar Q, substantially as described.

5. The combination of the slotted bar Q, the seed-box R, and the pin $r^2$, substantially as described.

6. The combination of the beams G $G^2$ and the tie G', substantially as described.

7. The combination of the chains U U, the guides V V, the thills V', the bolts W W, and the beams G G, substantially as described.

PAUL SINNHOLD.

Witnesses:
C. D. MOODY,
SAML. S. BOYD.